United States Patent Office 3,075,442
Patented Jan. 29, 1963

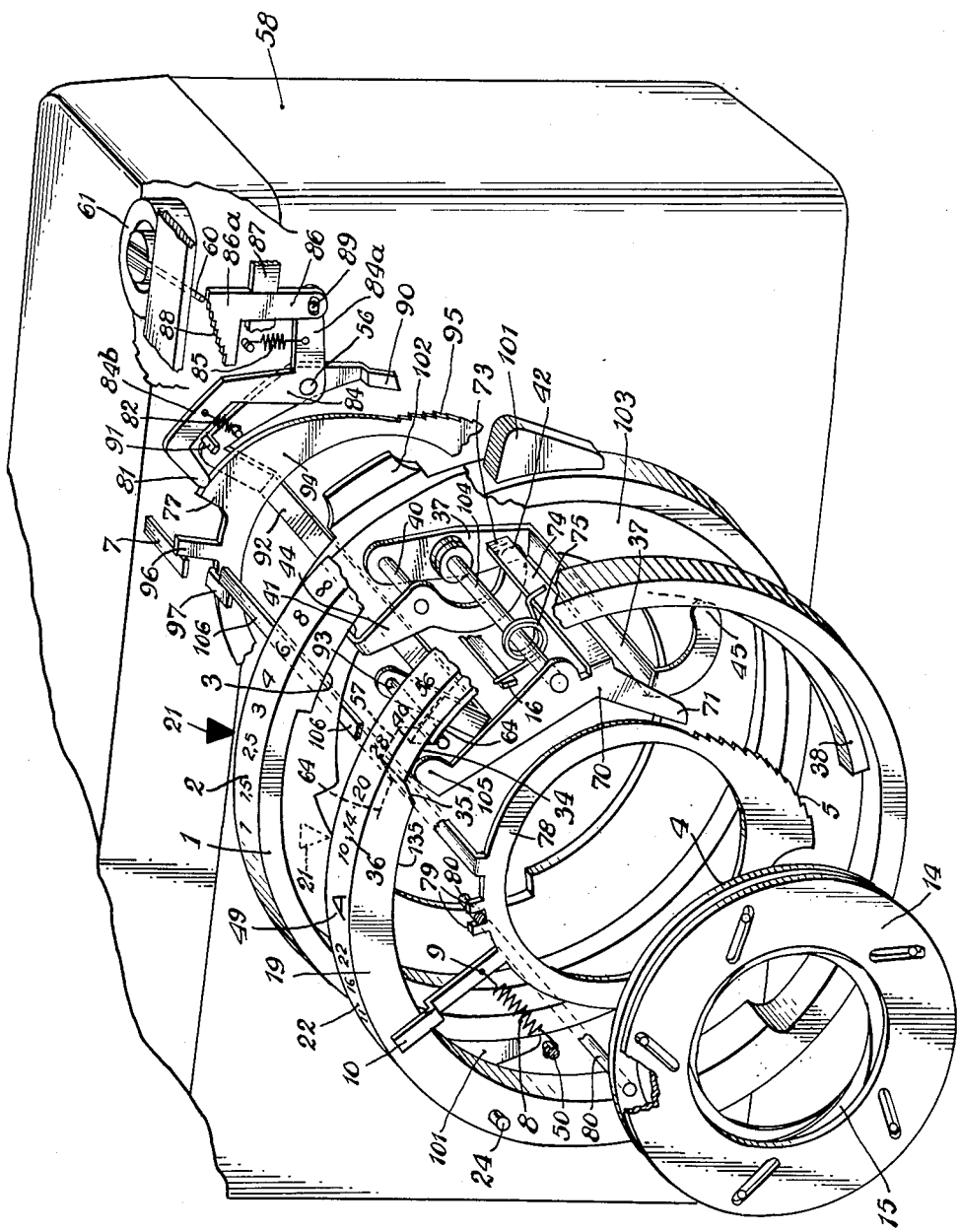

3,075,442
PHOTOGRAPHIC CAMERA PROVIDED WITH INTERCHANGEABLE LENS SYSTEMS
Heinz Köppen, Stuttgart, and Willi Günther, Stuttgart-Möhringen, Germany, assignors to Zeiss Ikon Aktiengesellschaft, Stuttgart, Germany
Filed June 14, 1962, Ser. No. 202,522
Claims priority, application Germany June 24, 1961
11 Claims. (Cl. 95—10)

This invention relates to improvements in photographic cameras and concerns particularly photographic cameras which are provided with an automatic flash exposure mechanism.

Photographic cameras, objectives and shutter mechanisms therefor have heretofore been provided with several operating ranges, such as an operating range for flash bulb exposures, a range for manual adjustment of the diaphragm or for the pre-selection of diaphragm apertures, and in some cases even a range within which an exposure mechanism is automatically adjusted, and still another range for an automatic flash exposure mechanism. The automatic flash exposure mechanism has the function to adjust automatically the diaphragm in dependence of the adjusted guide number and the distance of the object to be photographed from the camera so that the user of the camera is relieved of any calculations and thinking processes.

It is now an important object of the invention to apply all of the above features, which heretofore were designed for a camera provided with a single or fixedly mounted photographic lens system, to a photographic camera which is provided with interchangeable photographic lens systems.

In particular, it is an object of the invention to provide a photographic camera adapted for interchangeable lens systems with an automatic flash exposure, preferably arranged within the range of the automatic exposure mechanism and within a range of the manual diaphragm adjustment or diaphragm preselection.

These and other objects of the invention are obtained by providing the camera with an adjustable member, such as an intermediate ring, which is connectable with the diaphragm mechanism of the interchangeable photographic lens system and is controlled by the scanning device of the automatic exposure mechanism by means of a path transformer, while the interchangeable lens system is provided with the adjustable members for the operation of the flash exposure mechanism and the manual diaphragm adjustment, and also with the scanning members which influence the diaphragm mechanism by means of a special path transformer.

These and other features of the invention will now be described with reference to the accompanying drawing which illustrates in a perspective view and to a certain degree diagrammatically one embodiment of a camera with an interchangeable photographic lens system according to the invention.

Referring to the drawing, a camera casing 58 is provided with a built-in exposure meter 61 for the automatic exposure adjusting mechanism. This exposure meter 61 has a movable hand 60 which cooperates with a scanning device 81 to 89. Furthermore, the camera casing 58 has mounted therein an intermediate ring 94 which is connectable with the diaphragm mechanism of the interchangeable lens system. Also arranged in the camera casing is a catch member 90 which is mounted on the same pivot pin 56 which supports the scanning device 81 to 89. This catch member 90 cooperates with a number of steps 95 provided on the outer circumference of the intermediate ring 94. The catch member 90 is controlled by the scanning device 81 to 89 in a manner described hereinafter and is provided with a forwardly extending arm 92 which projects into the lens system. The forward end of the arm 92 carries a scanning pin 93 which cooperates with connecting and disconnecting cams 57 and 64 on the inner circumference of an adjusting ring 19.

The scanning device of the exposure mechanism includes a bell crank lever 84 rotatably supported by the pivot pin 56 and having the end of one arm 84a connected by a pin and slot connection 89 with the lower end of a vertically slidable bar 86 slidably supported in a guide 87. The upper end of the bar 86 is integrally formed with an enlargement 86a having a series of steps 88 thereon which are adapted to be engaged by the outer end of the movable hand 60 of the measuring instrument 61 of the exposure meter. Obviously, a clamping device (not shown) for the movable hand 60 is provided to lock it temporarily in its deflected position. A spring 85 effects in the desired moment, namely when the camera shutter is released, a quick upward movement of the slidable bar 86 toward the hand 60. The other arm 84b of the bell crank lever 84 terminates in a downwardly extending scanning nose 81 which cooperates with an outwardly extending cam 77 on the intermediate ring 94. The intermediate ring 94 has also a radially outwardly extending arm 96 against which comes to rest—when the shutter has been tensioned—a locking member 7 controlled by the shutter winding mechanism. This means that the intermediate ring 94—when the shutter is tensioned—is held in a position which corresponds to an extreme open position, preferably the largest diaphragm aperture of the diaphragm mechanism 4, 14, 15. The intermediate ring 94 has also an axially extending arm 97 on its circumference which cooperates with an axially extending arm 106 on a ring 78 provided on the lens system. This last named ring 78 in turn is connected by a coupling 79, 80 with the diaphragm mechanism 4, 14, 15. In addition, a radial arm 10 on the ring 78 has attached thereto at 9 one end of a helical spring 8 the other end of which is attached at 50 to a stationary part of the camera casing. The spring 8 causes the ring 78, when the camera shutter is released, to move in a direction in which the diaphragm is closed.

When the camera shutter is tensioned, the scanning nose 81 rests upon the cam 77 of the intermediate ring 94. This means that also in the connected range of the exposure mechanism, i.e. when the scanning pin 93 engages the cam 57, the scanning device 81 to 89 is blocked and the indicating hand 60 has an opportunity to be deflected and to move into a position which corresponds to the prevailing lighting conditions of the subject to be photographed. Upon release o fthe shutter the rings 94 and 78 and the rotatable diaphragm cage 4 start to rotate counterclockwise with the result that the scanning nose 81 moves downward along the cam 77. This gives the scanning device 81 to 89 the opportunity to execute its scanning operation with respect to the indicating hand 60.

An additional spring 82 is arranged between the bell crank lever 84 and the catch member 90. This spring 82 effects a good engagement between the coupling projection 91 on the catch member 90 and the adjacent arm of the bell crank lever 84 after the shutter has been released. As a result of this spring connection the catch member 90 follows the movement of the scanning device and adjusts itself corresponding to the end positions of the scanning device in front of the series of steps 95 on the ring 94. Upon release of the shutter and after a shorter or longer return movement of the intermediate ring 94 depending upon the position of the catch member 90, the latter will come into engagement with one of the steps of the series of steps 95. This means that in accordance with the prevailing and measured brightness value the diaphragm will be automatically adjusted to the correct aperture. The projection 97 is arranged on the ring 94 in such a position that after the attachment of the interchangeable lens system to the lens mount 103 by means of bayonet projections 102 it comes into coupling engagement with a counter projection 106 of the lens system when the camera or rather the shutter has been tensioned. The arm 92 on the catch member 90 engages with its pin 93 the previously mentioned cams on the adjusting ring 19 when the interchangeable lens system is attached to the camera casing.

The interchangeable lens system is provided with two adjustable members consisting of a distance adjusting ring 1 with a distance scale 2 thereon and the adjusting ring 19 having a number of operating ranges indicated by two different scales and one mark for the adjustment of the exposure mechanism. One of the two different scales comprises a diaphragm aperture scale 22 for the range of manually adjusting the diaphragm or preselecting the diaphragm aperture. The other one of the two scales is a guide number scale 36 employed for the flash bulb exposure mechanism. Between these two circumferentially spaced scales 22 and 36 is arranged a single mark A for the automatic exposure mechanism. Both scales 22 and 36 and the mark A are adjustable relatively to a common stationary index mark 21 arranged on the camera casing. The various rings which appear in the drawing in an axially spaced position are in actual practice arranged one next to the other. The distance adjusting ring 1 is provided with outwardly projecting handles 101 to make an adjustment of this ring more convenient when the camera is held in front of the eyes of the user.

The inner circumference of the distance adjusting ring 1 is provided with a control cam 3 which causes a pivotal movement of the control lever 44 one end 41 of which engages the cam 3. The pivotal movement of the lever 44 takes place in accordance with the distance value which has been moved opposite the index 21. It will be noted that the cam 3 at the lower distance values is raised more toward the axis of the lens system than at the greater distance values. The shape of the cam 3 is so designed that it compensates the prevailing differences in the characteristics of the distance adjustment mechanism and of the diaphragm mechanism. Upon adjustment to smaller distance values the cam surface 41 of the control lever 44 is moved farther toward the optical axis of the lens system and the lever 44 performs a rotative movement in counterclockwise direction. The pivot axis is formed by a shaft 40. The control lever 44 is in operative connection with the catch lever 70 by means of its lower end 42 which engages a lateral projection 74 at 73 on the catch lever 70. A helical spring 75 which surrounds the pivot pin 104 of the lever 70 engages with one of its ends the lateral projection 74 and with its other end a stationary anchor member 16, and assures a good engagement of the parts 42 and 73.

When upon adjustment to small distance values the control lever 44 performs a counterclockwise rotative movement, the catch lever 70 also rotates in the same direction and its catch tooth 71 is moved away from the series of steps 5 on the ring 78. This means that upon release of the shutter the diaphragm mechanism can perform a longer return movement before the parts 5 and 71 come into engagement with each other so that consequently the diaphragm is able to close to a smaller aperture. The catch lever 70 is constructed in the form of a bell crank lever which is pivotally mounted between its ends on the above mentioned pivot pin 104. The upwardly extending arm of the lever 70 is provided with a nose 105 which engages the connecting and disconnecting cams 34 and 35 on the adjusting ring 19. In the drawing the range of the flash bulb mechanism has been adjusted as shown by the flash guide number 10 which is opposite the index 21. When changing from this flash bulb range to one of the other operating ranges, the nose 105 of the lever 70 moves from the cam 35 onto the disconnecting surface 135 which rotates the lever 70 into such a position that an engagement of the end 71 of the lever 70 with the series of steps 5 is rendered impossible.

The flash bulb mechanism is provided with a pivoted lever 37 which engages the guide number cam 38. The lower end 45 of this lever 37, which is pivotally supported between its ends, engages the cam 38 which when smaller guide values are used recedes relative to the outer diameter of the adjusting ring 19, while upon adjustment to higher guide numbers the cam 38 is raised with respect to the inner circumference of the ring 19. This has the result that upon adjustment to higher guide numbers the lever 37, which is rotatably mounted on the pivot pin 104, performs a clockwise rotative movement.

The transfer of this movement does not take place directly but by means of the control lever 44 whose lower end 42 establishes the only operative connection with the catch lever 70. This indirect transmission of the movement of the lever 37 to the catch lever 70 is accomplished by the shaft 40 of the lever 37 which is carried by the lever 37. When now the lever 37 performs a clockwise movement upon adjustment to higher flash guide numbers, then the lever 44 which engages the cam 3 performs a counterclockwise rotation which results in the removal of the catch nose 71 of the lever 70 from the series of steps 5. Therefore, also when higher flash guide numbers are adjusted a longer return movement of the diaphragm mechanism is possible, when the shutter is released, before an engagement of the nose 71 with the series of steps 5 takes place.

The adjusting ring 19 carries on its face a stop pin 24 which becomes effective within the range of manual diaphragm adjustment and/or diaphragm preselection. The radial arm 10 on the ring 78 is so constructed that it serves as an abutment for the stop pin 24. These two stops 24 and 10 effect a manual diaphragm adjustment. The stop pin 24 forms the preselection stop when the ring 19 is adjusted to the manual diaphragm adjusting range. When the diaphragm has been adjusted to $f:22$, the pin 24 has the greatest circumferential distance from the arm 10 and this means that upon release of the shutter the rings 78 and 4 can perform their longest return movement. When the largest possible diaphragm aperture has been adjusted by the ring 10, the return movement of the rings 78 and 4 is the shortest.

The operation of the camera or of the photographic objective equipped with the devices of the present invention and when adjusted to the individual operating ranges is easy to understand. When the range of automatic exposure adjustment is used, the mark A indicated with 49 is moved opposite the index 21, and when the shutter has been tensioned an operation of the scanning device 81 to 89 is prevented because the scanning nose 81 engages the raised cam 77 on the intermediate ring 94. Upon release of the shutter the scanning device is released and the slidable bar 86 carrying the series of steps 88 moves quickly upwardly under the action of the spring 85 and depending upon the position of the indicating hand 60 is arrested sooner or later, namely when one of the steps 88 engages the hand 60. The catch member 90 is pivotally adjusted in dependence of the engagement of the parts 60 and 88 and assumes a corresponding angular position with respect to the abutment steps 95 on the ring 94. The rings 94, 78 and 4, which have been released by the locking member 7 upon release of the shutter, return under the action of the spring 8 until the member 90 engages one of the steps 95 on the ring 94. Upon retensioning of the shutter the stop connections between 90 and 95, and 60 and 88 are released because the intermediate ring 94 by the return of the locking member 7 has been brought into the illustrated position in which the scanning nose 81 of the bell crank lever 84 has again moved to the highest point of the cam 77. This operation is repeated when the shutter controlling the member 7 is released again.

When the camera is used with the range employing automatic adjustment for flash bulb exposures, the control pin 93 is moved away from the recessed cam portion 57 and engages the raised disconnecting cam 64 so that the catch member 90 is moved away from the steps 95 and a diaphragm adjustment in dependence of the exposure meter mechanism is prevented. The scanning nose 105 of the catch lever 70 of the flash bulb exposure mechanism has moved from the raised cam 135 downwardly into the recess 34, thereby rendering inoperative the blocking of the individual elements of the flash bulb exposure mechanism. It has been explained previously that upon an adjustment to smaller distances and also to higher flash guide numbers the catch nose 71 moves away from the abutment steps 5 on the ring 78. Upon adjustment of the ring 1 to greater distance values and smaller guide numbers, respectively (this is not possible in the illustrated example of the invention), a rotation of the catch member 70 in clockwise direction would take place and therewith the catch nose 71 would move toward the abutment steps 5. This means that when shorter distances and higher guide numbers are selected, the diaphragm would close correspondingly prior to the release of the shutter, whereas upon adjustment to greater distances and lower guide numbers the diaphragm would remain fully or almost fully open.

Upon adjustment of the ring 19 to manual diaphragm setting the control pin 93 moves upon the disconnecting cam 64 and the nose 105 moves upon the disconnecting cam 135 so that both automatic adjusting devices are blocked and rendered inoperative and the camera may now be used as a conventional or manually adjustable camera. Depending upon the adjusted diaphragm aperture, the distance between the stop pin 24 and the counter stop member 10 decreases or increases so that upon release of the shutter and after a longer or shorter return run of the diaphragm mechanism the rings bearing the elements 24 and 10, respectively, come into engagement with each other, thereby forming the desired diaphragm aperture.

What we claim is:

1. In a photographic camera, the combination with an interchangeable lens system provided with an adjustable diaphragm, of means providing for flash bulb exposure operation and for a plurality of other operations including a manual diaphragm adjustment including a diaphragm preselection, and an automatic exposure adjustment, including on said lens system a roratably adjustable ring (19) for said different operations, said adjusting ring extending concentrically about the optical axis of said lens system, cams on said adjusting ring, means for automatically adjusting said diaphragm within the range of said flash bulb exposure operation, said means including adjustable scanning elements engaging said cams on said adjusting ring, the latter having guide numbers and a diaphragm scale thereon, while another scanning element engages a cam on a distance adjusting ring (1) arranged adjacent said first mentioned adjusting ring, an intermediate ring (94) mounted within the camera and controlled by a scanning device cooperating with the movable hand of a measuring instrument of an exposure meter, and pivotally mounted levers influenced by said scanning elements and carried by said lens system for adjusting said diaphragm when said flash bulb exposure operation and said automatic exposure operation is used.

2. A photographic camera according to claim 1, in which the scanning device cooperating with said movable hand includes a pivotally mounted bell crank lever, one arm of which forms a scanning nose (81) engaging a cam on said intermediate ring (94) which carries on another portion of its circumference a series of abutment steps (95) adapted to be engaged by one end of a pivoted lever (90) carried by said bell crank lever, said pivoted lever having a lateral projection extending into said lens system to cooperate with the cams on said adjusting ring.

3. A photographic camera according to claim 1, including a projection (97) on said intermediate ring (94) which cooperates with a coupling projection (106) on a ring (78) forming a part of said diaphragm mechanism in said lens system.

4. A photographic camera according to claim 1, including a projection (97) on said intermediate ring (94) which cooperates with a coupling projection (106) on a ring (78) forming a part of said diaphragm mechanism in said lens system, said coupling projections (97, 106) being arranged to one another on their respective rings (94, 78) in such a manner that after attachment of said interchangeable lens system to the camera said diaphragm will be fully open when the camera has been tensioned.

5. A photographic camera according to claim 1, in which the scanning device cooperating with said movable hand includes a pivotally mounted bell crank lever, one arm of which forms a scanning nose (81) engaging a cam on said intermediate ring (94) which carries on another portion of its circumference a series of abutment steps (95) adapted to be engaged by one end of a pivoted lever (90) carried by said bell crank lever, said pivoted lever having a lateral projection extending into said lens system to cooperate with the cams on said adjusting ring, said scanning nose (81) when engaging the highest point of said cam (77) on said intermediate ring being effective to block said scanning device when the camera has been tensioned.

6. A photographic camera according to claim 1, in which the scanning device cooperating with said movable hand includes a pivotally mounted bell crank lever, one arm of which forms a scanning nose (81) engaging a cam on said intermediate ring (94) which carries on another portion of its circumference a series of abutment steps (95) adapted to be engaged by one end of a pivoted lever (90) carried by said bell crank lever, said pivoted lever having a lateral projection extending into said lens system to cooperate with the cams on said adjusting ring, said pivoted lever (90) being provided with a coupling projection (91) operatively engaging said bell crank lever when the camera is released.

7. A photographic camera according to claim 1, in which said intermediate ring (94) is provided with an outwardly extending arm (96) which in the tensioned condition of the camera engages a locking member (7) which prevents a return movement of a diaphragm control ring (4) of said diaphragm.

8. A photographic camera according to claim 1, in which one (70) of said pivoted levers for the purpose of determining the diaphragm aperture within the flash bulb exposure range is controlled by a pivotally supported scanning lever (44) whose pivotal position is determined by the selected guide number and distance, one end of said pivoted lever (70) cooperating with a series of abutment steps (5) provided on said diaphragm mechanism.

9. A photographic camera according to claim 1, in which one of said scaning elements (37) for the flash bulb exposure range which engages the cam (38) associated with the guide number adjustment is mounted on a shaft (40) which carries the levers (44, 70) of which one (44) forms the scanning element for the distance cam (3) on the distance ring (1), said lever (44) being connected with said pivoted lever (70) by a coupling connection (42, 73) and a spring (75).

10. A photographic camera according to claim 1, in which one of said scanning elements (37) for the flash bulb exposure range which engages the cam (38) associated with the guide number adjustment is mounted on a shaft (40) which carries the levers (44, 70) of which one (44) forms the scanning element for the distance cam (3) on the distance ring (1), said lever (44) being connected with said pivoted lever (70) by a coupling connection (42, 73) and a spring (75), said pivoted lever being provided with an abutment for one end of said spring and also with a scanning nose (105) which cooperates with connecting and disconnecting cam faces (34, 135) of the flash bulb exposure range on said adjusting ring (19).

11. A photographic camera according to claim 1, in which one of said scanning elements (37) for the flash bulb exposure range which engages the cam (38) associated with the guide number adjustment is mounted on a shaft (40) which carries the levers (44, 70) of which one (44) forms the scanning element for the distance cam (3) on the distance ring (1), said lever (44) being connected with said pivoted lever (70) by a coupling connection (42, 73) and a spring (75), said pivoted lever being provided with an abutment for one end of said spring and also with a scanning nose (105) which cooperates with connecting and disconnecting cam faces (34, 135) of the flash bulb exposure range on said adjusting ring (19), said pivoted lever being rotatably mounted on a shaft (104) about which said spring is coiled, one end of said spring engages said abutment while the other end is attached to a stationary point (16).

References Cited in the file of this patent

UNITED STATES PATENTS

| | | |
|---|---|---|
| 2,993,422 | Rentschler | July 25, 1961 |
| 3,029,718 | Rentschler | Apr. 17, 1962 |